Figure 1:
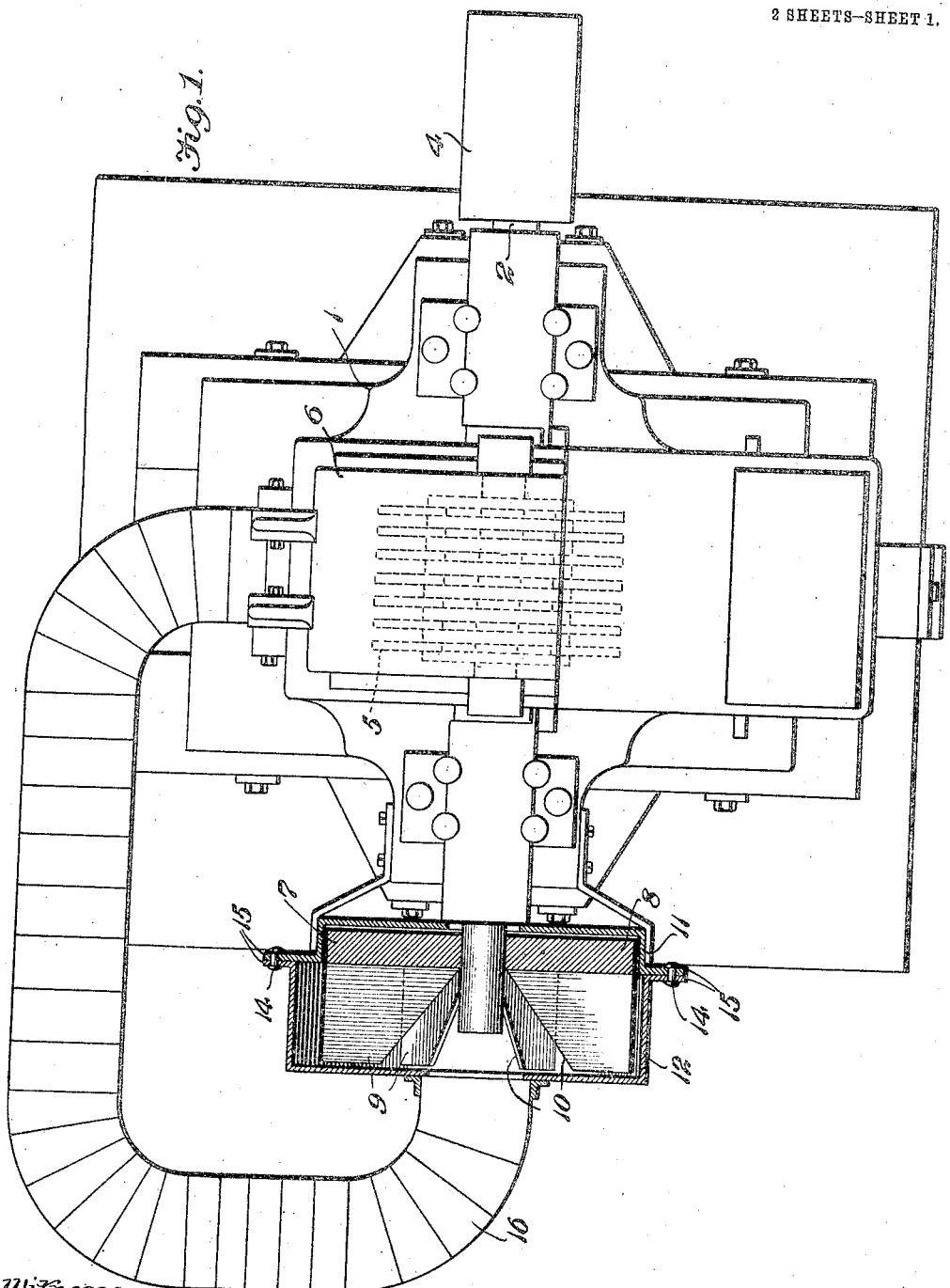

M. F. WILLIAMS.
BLOWER FOR ROTARY MILLS.
APPLICATION FILED FEB. 5, 1914.

1,103,237.

Patented July 14, 1914.
2 SHEETS—SHEET 1.

Witnesses:

Inventor:
Milton F. Williams,

M. F. WILLIAMS.
BLOWER FOR ROTARY MILLS.
APPLICATION FILED FEB. 5, 1914.
1,103,237.
Patented July 14, 1914.
2 SHEETS—SHEET 2.
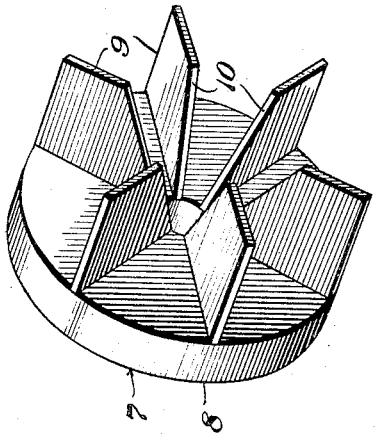
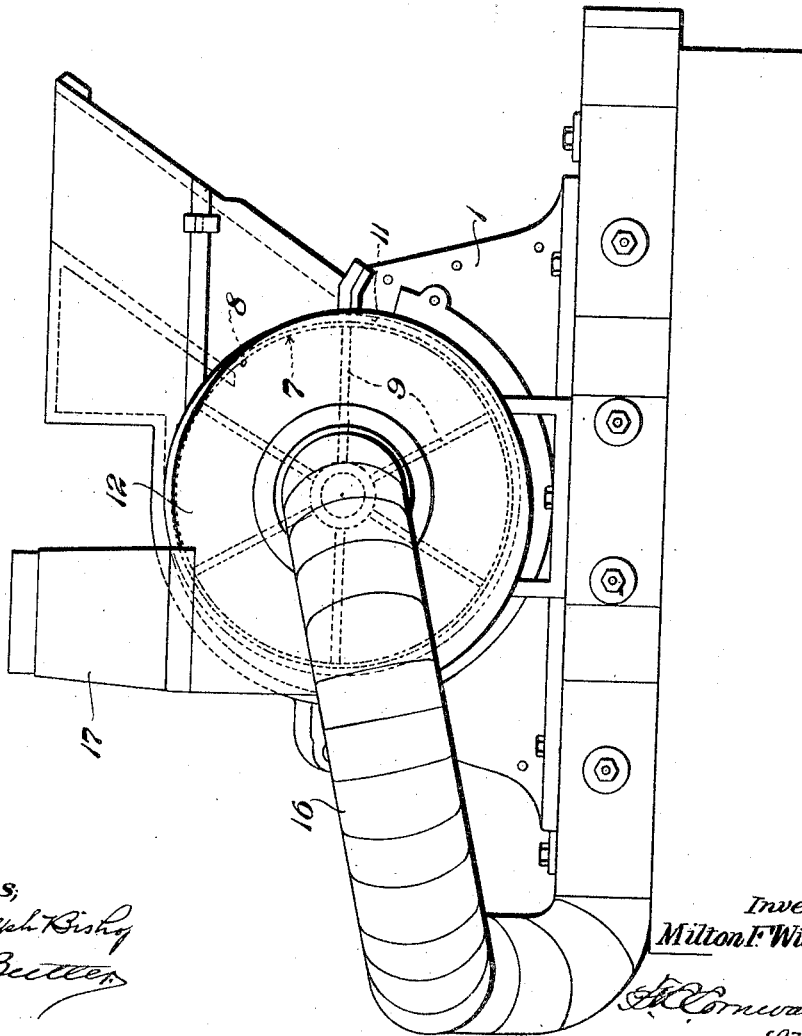

UNITED STATES PATENT OFFICE.

MILTON F. WILLIAMS, OF ST. LOUIS, MISSOURI, ASSIGNOR TO WILLIAMS PATENT CRUSHER AND PULVERIZER COMPANY, OF ST. LOUIS, MISSOURI, A CORPORATION OF MISSOURI.

BLOWER FOR ROTARY MILLS.

1,103,237.    Specification of Letters Patent.    Patented July 14, 1914.

Application filed February 5, 1914. Serial No. 816,774.

*To all whom it may concern:*

Be it known that I, MILTON F. WILLIAMS, a citizen of the United States, residing at the city of St. Louis, State of Missouri, have invented a certain new and useful Improvement in Blowers for Rotary Mills, of which the following is a full, clear, and exact description, such as will enable others skilled in the art to which it appertains to make and use the same, reference being had to the accompanying drawings, forming part of this specification, in which—

Figure 1 is a top view of a rotary mill showing the blower in section. Fig. 2 is a side elevation of a mill showing the blower in elevation. Fig. 3 is a perspective of the fly wheel fan.

My invention relates broadly to milling, and specifically to a form of blower particularly adapted for rotary mills and having the fan blades carried on the fly wheel of the mill and a fan and fly wheel casing of special design for the fly wheel and fan.

The purpose of the invention is to provide a very simple and strong form of blower which is built onto the mill itself and constitutes a portion of mill structure.

A further object of my invention is to provide a blower of a form particularly adapted to use with a rotary reducing mill and adapted to handle the product of the mill.

Other and further objects of my invention will be obvious or hereinafter pointed out.

In the operation of rotary mills for reducing light products such as feed, leather, or fibrous materials, or for finely reducing heavier materials such as coal, or cement clinker, the most efficient way of handling product of the mill is to draw it out from the discharge hopper of the mill by pneumatic suction and convey it pneumatically to the place of delivery. For this purpose a rotary fan is usually employed, and it is the purpose of my invention to provide a fan of this sort which is operated as a portion of the mill, the same being carried by the fly wheel on the mill shaft. In conjunction with this fan, I employ a casing of special form which is adapted to cover and protect the fly wheel and the fan, operating to prevent egress of air or material therefrom at any point other than the exit, or the admission of air at any point other than the intake. In this connection, the special form of casing protects the fly wheel and the bearings of the mill from the fine product, and insures efficient operation of the blower. Furthermore, my construction not only decreases the original cost, but also decreases the cost of maintenance.

As illustrated in the drawings, 1 represents the frame of the mill in which is journaled the shaft 2 driven by the pulley 4 and carrying the beaters 5 which operate within the grinding chamber 6. Upon the shaft 2 is carried the fly wheel fan 7, the construction of which will be evident from Fig. 3. This fly wheel fan has the wheel portion 8 which performs the usual functions of a fly wheel, upon which are carried the fan blades 9. The fan blades 9 are disposed on the face of the wheel radially of the shaft and are of trapezoidal form having the sloping inner edges 10.

Mounted on the casing 1 is the blower casing comprising the wheel casing 11, and the fan casing 12. The wheel casing 11 is circular, and encompasses the fly wheel portion 8 on its inner and peripheral sides. The fan casing 12 is of spiral contour to provide a passageway for the material from the fan casing to the conduit. The wheel casing and fan casing are secured together by the rivets 14 through the flanges 15. The inlet conduit 16 leads from the discharge hopper of the machine to the fan casing, communicating with the latter axially of the shaft and the fan. As is most evident from Fig. 1 the fan blades 9 are disposed so that there is a completely open space in the center of the fan into which the material is drawn.

The fan operates in the usual fashion of a centrifugal fan, throwing the material which is drawn in axially out centrifugally by the air pressure. The material is conducted by the air blades out of the casing through the outlet 17 and conveyed to any desired place of disposal. The fan casing 12, as well as the wheel casing 11 is mounted on the frame of the machine, and forms a part of the machine.

A fan of the construction shown is particularly adapted for the use of very high speed, as it is very strong and has no loose parts to get out of order. Being carried by the fly wheel it is directly driven by the machine shaft, and does not require separate belting or transmission mechanism. In this fashion it not only decreases the original cost, but also decreases the cost of maintenance.

The casing by virtue of its form and construction performs the dual function of protecting the fly wheel and coöperating with the fan.

What I claim is:

1. In a device having an operating device operated by a shaft, the combination of a fly wheel carried by the shaft, fan blades mounted on the fly wheel, and a blower casing encompassing the fly wheel and the fan blades; said blower casing including a fly wheel casing encompassing the fly wheel and a fan casing secured to the fly wheel casing and coöperating with the fan blades, said fan casing being provided with an axial inlet opening and a tangential discharge opening.

2. In a device of the class described, the combination of a fly wheel, fan blades disposed radially on one face of said fly wheel, and a casing encompassing the fly wheel and the blades; said casing having a circular portion adapted to coöperate with the fly wheel, and a non-circular portion adapted to coöperate with the fan blades for the purpose described.

In testimony whereof I hereunto affix my signature in the presence of two witnesses, this 3d day of February, 1914.

MILTON F. WILLIAMS.

Witnesses:
ETHEL DALY,
TESSIE MCHUGH.